(12) United States Patent
Chauvin et al.

(10) Patent No.: US 10,137,606 B2
(45) Date of Patent: Nov. 27, 2018

(54) MOLDING APPARATUS WITH HYDROPHOBIC PROPERTIES AND METHOD

(71) Applicant: DISCMA AG, Zürich (CH)

(72) Inventors: Guillaume Chauvin, Duchess Manor (SG); Damien Jean-Philippe Kannengiesser, Golbey (FR); Samuel Odet, Vevey (CH)

(73) Assignee: Discma AG, Zürich (CH)

( * ) Notice: Subject to any disclaimer, the term of this patent is extended or adjusted under 35 U.S.C. 154(b) by 331 days.

(21) Appl. No.: 14/779,073

(22) PCT Filed: Mar. 25, 2014

(86) PCT No.: PCT/EP2014/055910
§ 371 (c)(1),
(2) Date: Sep. 22, 2015

(87) PCT Pub. No.: WO2014/154659
PCT Pub. Date: Oct. 2, 2014

(65) Prior Publication Data
US 2016/0052177 A1 Feb. 25, 2016

(30) Foreign Application Priority Data
Mar. 26, 2013 (EP) .................... 13161085

(51) Int. Cl.
*B29C 33/56* (2006.01)
*B29C 33/42* (2006.01)
*B29C 49/12* (2006.01)
*B29C 49/46* (2006.01)
*B29C 49/48* (2006.01)
(Continued)

(52) U.S. Cl.
CPC .............. *B29C 33/56* (2013.01); *B29C 33/42* (2013.01); *B29C 49/12* (2013.01); *B29C 49/46* (2013.01); *B29C 49/48* (2013.01); *B29C 2049/4664* (2013.01); *B29C 2049/4694* (2013.01); *B29C 2049/4874* (2013.01); *B29C 2049/4897* (2013.01); *B29K 2105/258* (2013.01);
(Continued)

(58) Field of Classification Search
None
See application file for complete search history.

(56) References Cited

U.S. PATENT DOCUMENTS

| 2005/0163951 A1* | 7/2005 | Oles | ................... B01L 3/00 428/35.7 |
| 2008/0182102 A1* | 7/2008 | Sano | ................. B29C 33/56 428/341 |

(Continued)

FOREIGN PATENT DOCUMENTS

| EP | 0841140 A2 | 5/1998 |
| EP | 1798015 A1 | 6/2007 |

(Continued)

*Primary Examiner* — Monica A Huson
(74) *Attorney, Agent, or Firm* — Eric J. Sosenko; Jonathan P. O'Brien; Honigman Miller Schwartz and Cohn LLP

(57) ABSTRACT

A molding apparatus and method for the combined manufacturing and filling of plastic containers in a one step process. The molding apparatus and method utilize a mold having an inner cavity with surfaces presenting hydrophobic properties thereby enabling a resultant container to have flawless appearance.

13 Claims, 1 Drawing Sheet

(51) Int. Cl.
*B29K 105/00* (2006.01)
*B29L 31/00* (2006.01)

(52) U.S. Cl.
CPC .. *B29K 2905/02* (2013.01); *B29K 2995/0093* (2013.01); *B29L 2031/712* (2013.01)

(56) References Cited

U.S. PATENT DOCUMENTS

2011/0159138 A1   6/2011  Paget et al.
2012/0091635 A1*  4/2012  Eberle ................... B29C 49/14
                                                            264/532

FOREIGN PATENT DOCUMENTS

JP       2005153246 A    6/2005
WO     2013/020885 A1   2/2013

* cited by examiner

MOLDING APPARATUS WITH HYDROPHOBIC PROPERTIES AND METHOD

CROSS-REFERENCE TO RELATED APPLICATIONS

This application is the U.S. national phase of PCT Application No. PCT/EP2014/055910 filed on Mar. 25, 2014, which claims priority to EP13161085.9 filed on Mar. 26, 2013, the disclosures of which are incorporated in their entirety by reference herein.

FIELD OF THE INVENTION

The invention relates to a mold for the manufacturing and filling of plastic containers enabling to have flawless appearance containers.

The invention also relates to a blow molding apparatus comprising said mold.

BACKGROUND

Plastic containers such as bottles of water or any other beverage are manufactured and filled according to different methods including blow molding or stretch-blow molding of a plastic preform.

According to one of these known methods a plastic preform is first manufactured through a molding process and then heated before being positioned inside a mould.

The preform usually takes the form of a cylindrical tube closed at its bottom end and open at its opposite end. The preform is made of plastic, preferably PET.

Once the preform has been positioned within the mould only the open end of the preform is visible from above the mould.

This method makes use of a stretch rod which is downwardly engaged into the open end of the preform so as to abut against the closed bottom end thereof. The stretch rod is further actuated to be urged against the closed end, thereby resulting in stretching the preform.

After the stretching phase has been initiated an incompressible fluid, preferably a liquid, is injected into the preform through its open end. This liquid injection causes expansion of the preform until the preform comes into contact with the inner walls of the mould (defining an inner surface of the mold), thereby achieving the final shape of the container.

In a combined forming-filling container fabrication process, it is important to ensure that the preform is fully expanded into the cavity of the mold and that all of the contours of the resulting container are fully formed.

The injected liquid is preferably the one to be contained in the container as final product. Generally the liquid is a water based product and/or beverage.

When the forming and filling of the container is performed and the container full of its contents, the venting of the container is done. A possible step of adjustment of the volume of the volume of the liquid in the container may be necessary. At this stage of the process the mould is opened for allowing ejection of the container out of the mold and ready for beginning a new production cycle.

The venting of the container to atmospheric pressure, the withdrawal of the stretch rod from the container or the adjustment of the volume of the liquid in the container, which are detailed steps of the above described process, generally results in liquid dropping on the molding and filing apparatus. Some liquid droplets can especially fall on the inner surface of the mould when the container is ejected out of the mould.

The presence of droplets on the inner surface of the mould will affect the appearance of the next container to be produced during the next cycle. Indeed, the residual droplets are an obstacle to the preform's complete expansion onto the mould surface. As a result, creases and ribs are created at the surface of the container to be further produced.

The creases and ribs are unaesthetic and clearly undesirable for products to be sold to consumers.

A possible solution to get rid of these residual droplets could be to blow compressed air within the mould when it is opened for ejection of the container between two molding cycles but this solution increases cycle time and the cost of the process.

Thus, there exists a need for a solution enabling to produce container using an incompressible fluid blow molding or stretch blow molding process in which the containers have flawless appearance.

SUMMARY OF THE INVENTION

In this respect, the invention provides a mould for a one step forming and filling of container process as defined in claim 1.

The specific hydrophobic properties of the inner surface of the mould make it possible to achieve a regular external surface of the container without any appearance defect. In effect, the mold having inner surface with hydrophobic properties, the water drops will not remain on the mold inner walls and will flow out of the mold thereby leaving a clean surface.

According to one aspect of the invention, the inner surface of the mould is provided with a hydrophobic coating.

According to a first feature, the hydrophobic coating is applied directly on the inner surface of the mold.

According to a second feature, the hydrophobic coating is applied on a primary coating layer of the mold, said coating layer presenting some catching/adhesion promoting properties in order for the hydrophobic coating to be applied easily on the mold surface.

According to another aspect of the invention, the inner surface of the mould is micro-structured.

In a possible alternative, the hydrophobic coating can also be micro-structured to the extent that it gives enhanced hydrophobic properties to the surface on which the preform is expanded.

This micro-structuring of the surface allows modifying the interaction of the liquid end product drops (mainly water based) with the inner mold surface rendering the surface more hydrophobic.

According to a further feature, the inner surface of the mould is subjected to a plasma treatment to render its surface hydrophobic. The inner surface of the mold is then directly subjected to a plasma treatment when fabricated.

Such plasma treatment allows modifying wettability of a given surface to render it hydrophobic when using appropriate process gases.

According to a further aspect of the invention, the mould is made of anodized aluminum.

The specific treatment of aluminum allows reducing the friction coefficient of the mod surface. A further treatment as plasma treatment or micro-structuring treatment can be applied on the mold to enhance hydrophobic properties.

According to a further characteristic of the mold, the mold is made of at least two parts which can be separated for opening of the mold.

Advantageously during the one step forming and filing process, the mould is opened and allows the water drops to be evacuated. These water drops resulting from the production of the plastic container using the combined forming and filing process are accumulated on the bottom of the mold and the opening of the mold make it possible to evacuate the water.

In a general way, the water drops are evacuated by gravity out of the mold when the mold is opened.

It is also possible to evacuate the water drops using centrifugal force when the mold or the molding apparatus is provided with a rotation system.

BRIEF DESCRIPTION OF THE DRAWINGS

Embodiments of the present invention will now be described, by way of examples, with reference to the accompanying figures in which.

DETAILED DESCRIPTION

Figure 1:
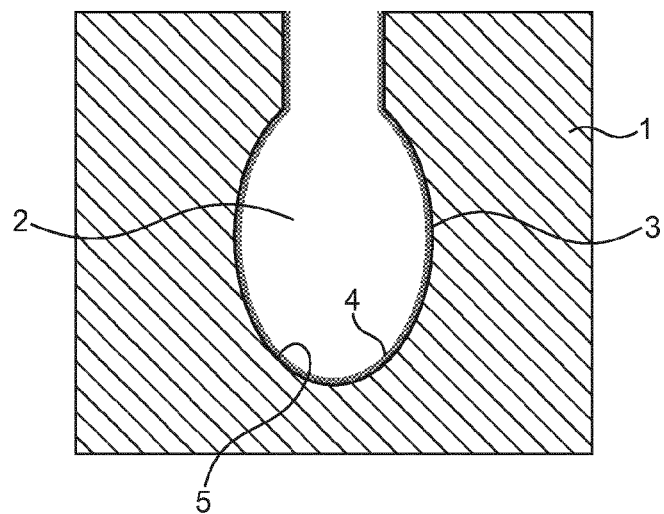
FIG. 1 is a schematic view of a mold used for the production of filled container using a one step forming and filling process presenting some water drops on its inner surface in a closed position.

FIG. 1 represents a schematic view of a mold used for the production of filled container using a one step forming and filling process. The mold 1 presents a cavity 2 having an inner surface 3 defining the contour of the container to be formed.

During the process, when extracting the formed and filled container (not represented) out of the mold 1, some liquid droplets 4 (mainly water based) can be spread on the inner surface 3 of the mold 1.

In order to ensure that the droplets will not remain on the inner surface 3 of the mold cavity 2, the inner surface presents hydrophobic properties and therefore will repel the liquid droplets.

In the embodiment of FIG. 1, the inner surface 3 is coated with a hydrophobic coating 5.

In the present case, the hydrophobic coating 5 is applied directly on the inner surface of the mold 3.

According to a second feature of the invention (not represented in the figures), the hydrophobic coating 5 is applied on a primary coating layer of the mold. Said primary coating layer has some adhesion promoter properties in order, for example, for the hydrophobic coating to be applied easily on the mold surface.

Several technologies for the fabrication of hydrophobic coating and primary adhesion promoter are known and available to the person skilled in the art. Such technologies are for example presented in the following patent publications: US 2004/082699, WO 2012173803 or KR2 0010028007. Hydrophobic coatings are also known as coating presenting "lotus effect" properties.

According to a third feature of the invention (not represented in the figures), the inner surface of the mould is micro-structured. The micro-structuring of the surface generally allows modifying the interaction of the water droplets with the inner mold surface rendering the surface more hydrophobic. Such micro-structured surface and their properties have already been disclosed and are available to the person skilled in the art, for example in WO 2011147757. The micro-structuring of the surface allows, in defined cases, having a super-hydrophobic surface with self cleaning properties.

According to a further feature, the inner surface of the mould is subjected to a plasma treatment to render its surface hydrophobic. The inner surface of the mold is then directly subjected to a plasma treatment when fabricated. Plasma treatment allows modifying wettability of a given surface to render it hydrophobic when using appropriate process gases.

Methods for preparing super-hydrophobic coating by plasma spraying have for example already been disclosed in patent publication CN 101942630 or U.S. Pat. No. 4,869,922. U.S. Pat. No. 4,869,922 discloses a surface treatment process of coating polyforuocarbon on the surface of an object using vacuum plasma to exhibit hydrophobicity.

According to a further aspect of the invention, the mould is made of anodized aluminum (not represented). This specific treatment of aluminum allows reducing the friction coefficient of the mold surface. A further treatment with plasma or with a micro-structuring process can be applied on the anodized aluminum mold to enhance hydrophobic properties. Further advantages of using anodized aluminum can be mentioned, for example anti-corrosion properties, adhesion promoter . . . .

As previously exposed, several treatments of the inner surface of the mold can be proposed in order to have an inner surface of the mold with hydrophobic properties. Such properties of the inner surface of the mold will allow eliminating possible water based droplets coming from the combined forming and filling process.

Figure 2:
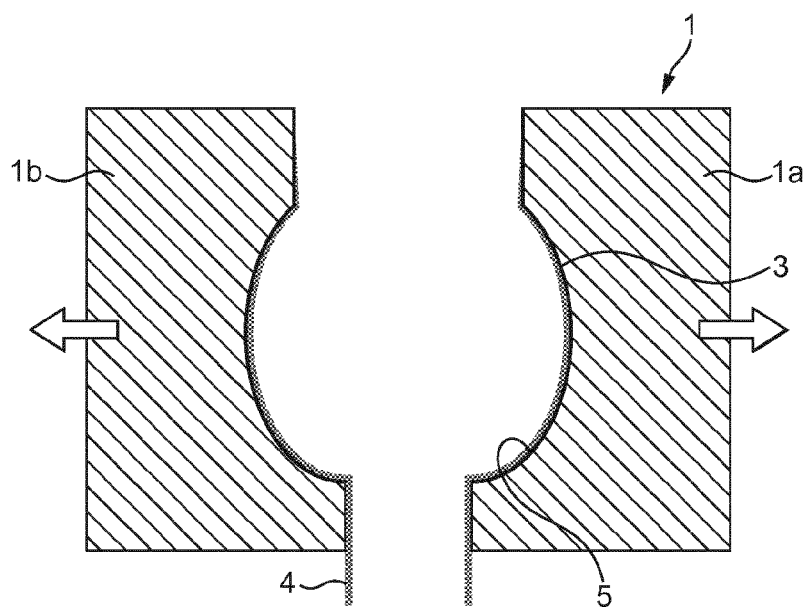
FIG. 2 is presenting the mould of FIG. 1 in an opened position.

FIG. 2 represents a schematic view of the mold of FIG. 1 in an opened position.

Advantageously during the one step forming and filing of container process, the mould 1 is opened (according to the arrows of FIG. 2) and allows the liquid drops 4 to be evacuated. These liquid drops 4 resulting from the production of the plastic container using the one step forming and filling process are accumulated on the bottom of the mold when it is closed and the opening of the mold makes it possible to evacuate the droplets out of the mold 1 by gravity.

In the current embodiment, the mold 1 is made of two parts 1a and 1b that can be separated for opening the mold. The mold can have more than two parts when necessary In a general way, the water drops are evacuated by gravity out of the mold when the mold is opened.

It is also possible in a further embodiment (not represented) to evacuate the water drops by using centrifugal force when the mold is provided with a rotation system or is integrated in a rotating system or in a rotating molding apparatus.

Combination between gravity and centrifugal forces for the evacuation of the liquid droplets is also intended.

Of course, the invention is not limited to the embodiments described above and in the accompanying drawings. Modifications remain possible, particularly as to the construction of the various elements or by substitution of technical equivalents, without thereby departing from the scope of protection of the invention.

The invention claimed is:

1. A molding apparatus for a one step forming and filling process of a plastic container from a preform comprising a mold having an inner surface and means for filling liquid product in the preform, the inner surface of the mold having hydrophobic properties, and the hydrophobic properties of the mold being non-transient.

2. A molding apparatus according to claim 1, wherein the inner surface of the mold has a hydrophobic coating.

3. A molding apparatus according to claim 1, wherein the inner surface of the mold is micro-structured.

4. A molding apparatus for a one step forming and filling process of a plastic container from a preform comprising a mold having an inner surface and means for filling liquid product in the preform, wherein the inner surface of the mold has hydrophobic properties and is subjected to a plasma treatment to render its surface hydrophobic.

5. A molding apparatus according to claim 1, wherein the mold is made of anodized aluminum.

6. A molding apparatus according to claim 1, wherein the mold is made of at least two parts which can be separated.

7. A method for forming and filling a plastic container from a preform, the method comprising the steps of:
positioning a preform in a mold, the preform having an open end and a closed end, only the open end of the preform being visible from above the mold,
downwardly engaging a stretch rod into the open end of the preform, the stretch rod being further actuated to be urged against the closed end, thereby resulting in stretching of the preform,
after the stretching the preform has been initiated, injecting a liquid into the preform through its open end, and expanding of the preform until the preform comes into contact with inner walls of the mold, thereby achieving the final shape of the container, and
preventing liquid product drops from remaining on the mold inner surface by having an inner surface of the mold provided with hydrophobic properties, wherein the mold is opened for evacuation of liquid drops resulting from the production of the plastic container using a one step forming and filling process.

8. A method for forming and filling a plastic container from a preform, the method comprising the steps of:
positioning a preform in a mold, the preform having an open end and a closed end, only the open end of the preform being visible from above the mold,
downwardly engaging a stretch rod into the open end of the preform, the stretch rod being further actuated to be urged against the closed end, thereby resulting in stretching of the preform,
after the stretching the preform has been initiated, injecting a liquid into the preform through its open end, and expanding of the preform until the preform comes into contact with inner walls of the mold, thereby achieving the final shape of the container, and
preventing liquid product drops from remaining on the mold inner surface by having an inner surface of the mold provided with hydrophobic properties, wherein the liquid drops are evacuated by gravity or centrifugal force.

9. The molding apparatus of claim 1, further comprising:
positioning means for positioning a preform in the mold,
a stretch rod engageable into an open end of the preform, the stretch rod being further able to be actuated to be urged against a closed end of the preform, thereby resulting in stretching of the preform, and
liquid injection means for injecting a liquid into the preform through the open end, as to cause expansion of the preform until the preform comes into contact with the inner walls of the mold, thereby achieving the final shape of the container.

10. A method for forming and filling a plastic container from a preform, the method comprising the steps of:
positioning a preform in a mold, the preform having an open end and a closed end, only the open end of the preform being visible from above the mold,
downwardly engaging a stretch rod into the open end of the preform, the stretch rod being further actuated to be urged against the closed end, thereby resulting in stretching of the preform,
after the stretching the preform has been initiated, injecting a liquid into the preform through its open end, and expanding of the preform until the preform comes into contact with inner walls of the mold, thereby achieving the final shape of the container,
removing the container from the mold, and
after removing the container from the mold, preventing liquid product drops from remaining on the mold inner surface by having an inner surface of the mold provided with hydrophobic properties.

11. The method according to claim 10, wherein the liquid injected in the injecting step is the final product to be contained in the container.

12. The method according to claim 11, wherein the final product is a water based product.

13. The method according to claim 10, further comprising the step of venting the preform during at least one of the stretching, injecting and expanding steps.

* * * * *